US008695982B2

(12) United States Patent
Jones

(10) Patent No.: US 8,695,982 B2
(45) Date of Patent: Apr. 15, 2014

(54) MODIFIED WAGERING GAME SYSTEMS AND METHODS

(75) Inventor: Steven A. Jones, Henderson, NV (US)

(73) Assignee: Lubin-Jones, LLC, Las Vegas, NV (US)

( * ) Notice: Subject to any disclaimer, the term of this patent is extended or adjusted under 35 U.S.C. 154(b) by 283 days.

(21) Appl. No.: 13/220,419

(22) Filed: Aug. 29, 2011

(65) Prior Publication Data

US 2012/0049457 A1 Mar. 1, 2012

Related U.S. Application Data

(60) Provisional application No. 61/377,861, filed on Aug. 27, 2010.

(51) Int. Cl.
*A63F 1/00* (2006.01)
*A63F 13/00* (2006.01)

(52) U.S. Cl.
USPC ............................................. 273/292; 463/12

(58) Field of Classification Search
USPC ................ 273/292, 274, 309; 463/12; 643/12
See application file for complete search history.

(56) References Cited

U.S. PATENT DOCUMENTS

| | | | | |
|---|---|---|---|---|
| 5,423,551 | A * | 6/1995 | Stavinsky | 273/306 |
| 2004/0056420 | A1* | 3/2004 | Keshishyan | 273/292 |
| 2006/0027967 | A1* | 2/2006 | Chen | 273/292 |

* cited by examiner

*Primary Examiner* — Benjamin Layno
(74) *Attorney, Agent, or Firm* — Howard & Howard Attorneys PLLC

(57) ABSTRACT

Systems and methods for providing, conducting and modifying an underlying wagering game involving standard playing cards, comprising the steps of providing one or more randomly ordered decks of playing cards; receiving a wager on the final outcome of the underlying game; dealing the playing cards according to the rules of the underlying game; comparing each playing card dealt with a preset criteria, wherein the preset criteria includes at least one identifiable characteristic associated with at least one card of the standard playing cards; and applying a game feature responsive to the satisfaction of the preset criteria, wherein the game feature immediately advances the game to a final outcome.

31 Claims, 4 Drawing Sheets

MODIFIED WAGERING GAME SYSTEMS AND METHODS

CROSS-REFERENCE TO RELATED APPLICATIONS FROM WHICH PRIORITY IS CLAIMED

This application claims the benefit of U.S. Provisional Patent Application No. 61/377,861 which was filed Aug. 27, 2010, the disclosure of which is incorporated herein by reference.

BACKGROUND

1. Field of the Invention

The present invention relates to systems and methods of providing, conducting and modifying wagering games. In particular, the invention relates to a system and method for providing and conducting a modified Blackjack game.

2. Description of the Related Art

Many card games have been developed over the years and some are particularly adapted for gambling. Typically, such games include a dealer who deals cards and one or more players who place wagers on whether an outcome will be achieved based on the cards that the dealer deals. One example in this regard is Blackjack which is also known as Twenty-One.

The objective of Blackjack is for a wagering player to finish a round of play with a hand of playing cards with a sum of the total value of cards coming as close as possible to the value of twenty-one, without the player hand total exceeding twenty-one. The game is played by one or more players against a dealer with the player making an initial wager on a final outcome under the rules of blackjack, which remain fairly consistent throughout the world, and with only minor variations in different casinos or jurisdictions. Players' hands that are less than or equal to twenty-one, and exceed the value of the dealer's hand wins. All players' hands that have a lower sum than the dealer's hand and all hands that exceed the sum of twenty-one lose. Dealer and Player hands with the same total value (without the player first busting, result in ties (called a "push"). An initial two-card hand totaling twenty-one points is called blackjack, and in the absence of the dealer having a similar hand, automatically wins, without respect to the dealer's hand final; count and is often paid at odds greater than 1:1.

One conventional method of playing Blackjack uses one or more standard decks of playing cards (a fifty-two card deck without jokers). Each numbered card is counted according to its face value. The Jacks, Queens and Kings are worth ten (10), and Aces are worth either one (1) or eleven (11), depending on which is most beneficial to the count of the hand. A "ten" card therefore hereinafter includes any card which has a value of ten in the game of Blackjack, that is, a numbered 10 card, Jacks, Queens and Kings.

Once all the bets are made, the dealer will deal the cards to the players. The dealer will make two passes around the table starting with the player farthest to the left so that the players and the dealer have one card after the first pass and then receive a second card each after the second pass. The two cards dealt to the dealer or house includes one card face up or otherwise exposed to view, usually the second (and last) card dealt.

A player views an initial value of cards in the player's hand, views the dealer's up-card (the exposed card) and then makes decisions on drawing or not drawing further playing cards. This further drawing is done in an attempt to try and win the hand by having a higher count than the dealer's hand without busting, or allowing the dealer to bust the house hand. The player can "stand" on any count of twenty-one or less. Once the player exceeds a count of twenty-one or "busts," the player wager is lost, whatever the ultimate point count of the dealer's hand. Usually, the dealer must hit when with a point count of less than seventeen. Normally a dealer must stand on a soft count of at least seventeen, a soft count being a hand value where an Ace is counted as a value of eleven. House rules may vary, however.

Although the game of Blackjack is a consistent winning game for the house, players tend to place the minimum wager on a blackjack game unless the player is using some system or feels that the cards are running in a favorable streak. While Blackjack is a very popular game, many new games which are quickly rising in popularity provide numerous wagering opportunities, thus increasing player participation and excitement. Consequently, further variations of existing wagering games are always of interest to players and casinos, and therefore, there is a desire for methods which would increase wagering in the game of Blackjack.

SUMMARY OF THE INVENTION

The invention is generally directed to systems and methods in which a special game play feature is triggered in a base game upon satisfaction of preset criteria. The preset criteria may relate to characteristics or symbols used among the gaming elements in the base game. The game play feature may result in a change to the normal play or outcome of the base game, such as immediately assigning a winning or losing outcome in the base game, immediately collecting all or a portion of any amount wagered in the base game, immediately awarding an amount equal or unequal to an amount wagered, etc. The game play feature may affect one or more players, the dealer or all players placing wagers on a certain outcome or hand, depending on the embodiment. The game play feature may be incorporated into the base game to provide a modified base game or be activated upon receipt of a special wager.

Some embodiments are directed to a method of providing and conducting a modified underlying wagering game involving standard playing cards, which includes the steps of: providing one or more randomly ordered decks of playing cards; receiving a wager on the final outcome of the underlying game; dealing the playing cards according to the rules of the underlying game; comparing each playing card dealt with a preset criteria, wherein the preset criteria includes at least one identifiable characteristic associated with at least one card of the standard playing cards; and applying a game feature responsive to the satisfaction of the preset criteria, wherein the game feature immediately advances the game to a final outcome.

In some embodiments of the aforementioned method, the preset criteria includes a first criterion of at least one first identifiable characteristic associated with at least one card of the standard playing cards and a second criterion of at least one second identifiable characteristic associated with at least one card of the standard playing cards, the first criterion and second criterion not being satisfied by the same card.

In some embodiments, the game feature may further include a first game feature responsive to the satisfaction of the first criterion and a second game feature responsive to the satisfaction of the second criterion, the first game feature being associated with a winning final outcome and the second game feature being associated with a losing final outcome.

In some embodiments, the winning final outcome is a win for a player responsive to the player being dealt a card which satisfies the first criterion.

In some embodiments, the winning final outcome is a win for all players responsive to any one player being dealt a card which satisfies the first criterion.

In some embodiments, the winning final outcome is a win for the dealer responsive to the dealer being dealt a card which satisfies the first criterion.

In some embodiments, the winning final outcome is a payout equal to the wager placed in connection with the hand dealt a card which satisfies the first criterion.

In some embodiments, the winning final outcome is a payout unequal to the wager placed in connection with the hand dealt a card which satisfies the first criterion.

In some embodiments, the losing final outcome is a loss for the player to which a card is dealt that satisfies the second criterion.

In some embodiments, the losing final outcome is a loss for all players if a card is dealt which satisfies the second criterion to any one player.

In some embodiments, the losing final outcome is a loss for the dealer responsive to the dealer being dealt a card which satisfies the second criterion. In such embodiment, the player may receive a portion of their wager or a preset amount responsive to a losing final outcome for the dealer.

In some embodiments, the losing final outcome is a loss of the wager placed in connection with the hand dealt a card which satisfies the second criterion.

In some embodiments, the losing final outcome is a loss of a portion of the wager placed in connection with the hand dealt a card which satisfies the second criterion.

In some embodiments, the underlying game of the aforementioned method may be Blackjack, Baccarat, Pai Gow, poker, a poker-based game, or any wagering game involving gaming elements such as playing cards.

In some embodiments, the particular game play feature is at least partially dependant on the game event, that is, the stage, condition or timing in the underlying game, in which the preset criteria is satisfied and may change accordingly. For example, if the preset criteria relates to the dealing of a card with an identified characteristic, then the game play feature may differ depending on which dealt card of all the cards dealt (e.g., the first, second, third, last, etc.), either to a player hand, group, side or community, includes the identified characteristic appears.

In some embodiments, the base game includes game events, such as the dealing of cards to form an initial hand and then the successive dealing of additional cards thereafter. In such embodiments, the game play feature may stay the same or differ if the preset criteria of dealing a card including an identified characteristic is satisfied in the initial hand as compared with the preset criteria being satisfied through the dealing of the additional cards dealt thereafter.

Some embodiments of the invention are directed to a method of providing and conducting a modified Blackjack game involving standard playing cards, comprising the steps of: providing one or more randomly ordered decks of playing cards; receiving a Blackjack wager from one or more participating players; dealing the playing cards to form an initial player hand for each participating player and the dealer according to the conventional rules of Blackjack; comparing each individual playing card dealt with a preset criteria, wherein the preset criteria includes at least one identifiable characteristic associated with at least one card of the standard playing cards; and applying a game feature responsive to the satisfaction of the preset criteria, wherein the game feature immediately advances the Blackjack game to a final outcome for one or more Blackjack wagers.

In some embodiments, the preset criteria of the aforementioned modified Blackjack game includes a first criterion of at least one first identifiable characteristic associated with at least one card of the standard playing cards and a second criterion of at least one second identifiable characteristic associated with at least one card of the standard playing cards, the first criterion and second criterion not being satisfied by the same card.

In some embodiments, the preset criteria of the aforementioned modified Blackjack game the game feature further comprises a first game feature responsive to the satisfaction of the first criterion and a second game feature responsive to the satisfaction of the second criterion, the first game feature being associated with a winning final outcome and the second game feature being associated with a losing final outcome.

In some embodiments, the winning final outcome of the aforementioned modified Blackjack game comprises a win for a player responsive to the player being dealt a card which satisfies the first criterion. The winning final outcome may comprise a loss for a player responsive to the player being dealt a card which satisfies the second criterion, a win for the dealer responsive to the dealer being dealt a card which satisfies the first criterion, a payout equal to the wager placed in connection with the hand dealt a card which satisfies the first criterion, and/or a payout unequal to the wager placed in connection with the hand dealt a card which satisfies the first criterion.

In some embodiments, a losing final outcome may comprise a loss for the dealer responsive to the dealer being dealt a card which satisfies the second criterion. A losing final outcome may include losing a portion of the wager placed in connection with the hand dealt a card which satisfies the second criterion.

In some embodiments, the first criterion is a Jack of a Clubs or Jack of Spades. The second criterion may be Jack of Hearts or Jack of Diamonds.

In some embodiments the aforementioned modified Blackjack game further includes the steps of: dealing one or more additional cards to the initial player hand to form a final player hand for any participating players remaining in the game; comparing each of the one or more dealt additional cards with the preset criteria, wherein the preset criteria includes at least one identifiable characteristic associated with at least one card of the standard playing cards; and applying the game feature responsive to the satisfaction of the preset criteria by an additional card, wherein the game feature immediately advances the Blackjack game to a final outcome if the final player hand to which the additional card is dealt card does not bust according to the conventional rules of Blackjack.

Some embodiments of the invention are directed to a system for providing a modified Blackjack game, which includes a communication device configured for receiving a Blackjack wager from a participating player and administering an award payout for a winning outcome to the player; a processor configured for providing representations of playing cards to form an initial player hand, comparing each playing card dealt with a preset criteria, wherein the preset criteria includes at least one identifiable characteristic associated with at least one card of the playing cards, applying a game feature responsive to the satisfaction of the preset criteria, wherein the game feature immediately advances the Blackjack game to a final outcome for the Blackjack wager, the final outcome being a winning outcome or a losing outcome; and a display device configured for displaying the playing cards to the participating player.

The communication device may be a data input and/or data output device or a remote computer terminal, such as a home computer or mobile device with access to local or global network. The system and communication device may be configured for providing the modified wagering game to players via an online system or the Internet. The processor may also be remotely located from the display device and communication device.

In some embodiments, the communication device, processor and display device are mounted within a unitary housing. The aforementioned system may be an electronic gaming machine or electronic platform including multiple data input devices providing player positions.

DETAILED DESCRIPTION

The exemplary embodiments herein relate to wagering games such as Blackjack variations in which additional side wagers other than the standard underlying game wagers are placed by players and received by the house or casino to be subsequently resolved in a secondary side wager game which is determined at least in part by some of the playing cards dealt for the underlying game.

It should be understood that the methods and steps recited herein may be partially or wholly carried out in a variety of ways, such as by a dealer physically using game elements in a casino, via an electronic gaming machine (EGM) in a gaming establishment, through a computer or portable device, such as a mobile phone, capable of communicating via the Internet, global telecommunication network or world wide web. It should further be understood that the methods and systems of the invention are described herein in connection with standard playing cards for illustrative purposes only, as the methods and systems of the invention may be used with non-standard playing cards or any other items with varying distinguishable symbols.

Figure 1:
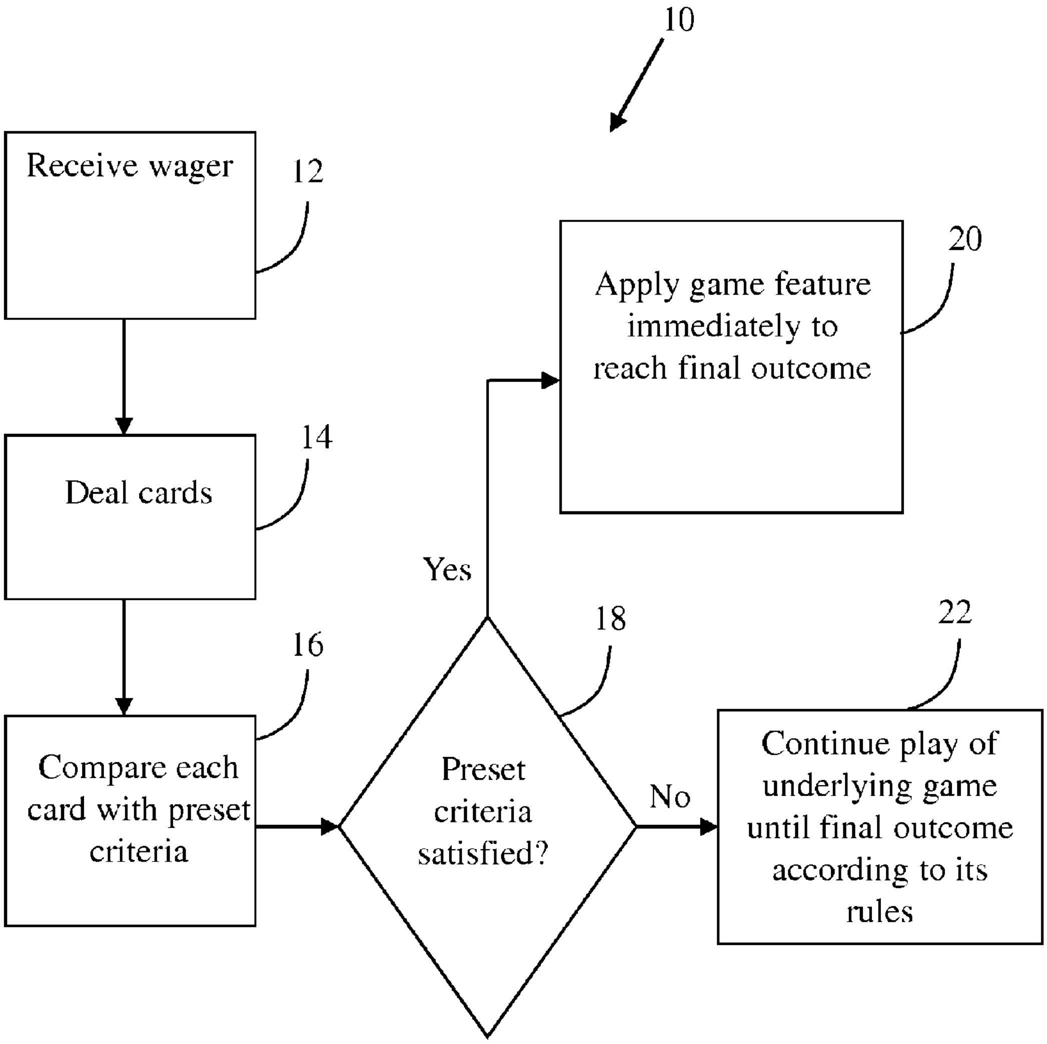
FIG. 1 is a process flow chart depicting an exemplary modified game play method configured and constructed according to some embodiments of the invention.

In some embodiments, the invention is directed to a method of playing an underlying game, such as Blackjack, which further includes a game play feature triggered by the satisfaction of preset criteria and various steps generally referred to by the reference numeral 10 in FIG. 1.

In step 12, a wager is received by a player interested in playing the underlying game, which in this embodiment may be any conventional game such as Blackjack, Baccarat, Poker or a poker-based game such as Pai Gow poker or any wagering game which employs any gaming elements such as standard or non-standard playing cards, tiles or symbols. For purposes of illustration, the underlying wagering game of this embodiment will employ one or more decks of standard playing cards, which may be randomly ordered and shuffled by hand or machine. It should be understood that receiving the wager involves the player affirmatively placing an amount at risk, such as placing a gaming chip on a designated betting area on a table game felt layout, on the occurrence of an uncertain event, such as achieving a ranked poker hand, a ranking higher than a dealer hand ranking, a hand closer to 9, a hand closer to 21 then a dealer hand but not above 21, or something else depending on the rules of the underlying game.

In step 14, playing cards or virtual representations thereof are dealt for the underlying game. For example, according to the rules of conventional Blackjack, the deal generally follows a pattern in which each player receives a first card, beginning with the player to the left-most of the dealer and then proceeding to the right until all players have a first card. Once the players each have a first card, then the dealer will receive a first card. The dealer will then deal a second a card to each player following the same pattern until the dealer deals the last card to form the dealer hand.

As shown in step 16, each of the cards dealt will be compared with the preset criteria as it is dealt. The preset criteria may relate to any one or more identifiable characteristics and/or sub-characteristics of one or more cards, including the card value, rank and/or suit.

As shown in step 18, if the preset criteria are satisfied, then the deal stops and a game feature is activated or applied as shown in step 20. In this embodiment, application of the game feature results in the immediate advancement of the underlying game to a final outcome. In other words, responsive to the preset criteria being satisfied, the deal stops and one or more players either lose or win the underlying game and are thus out of the game and not dealt any further cards, while the underlying game continues for remaining players, if any.

If the preset criteria are not satisfied in step 18, then the underlying game continues to a final outcome in the conventional fashion, that is, according to its rules, as shown in step 22.

In some embodiments, where further rounds of additional cards are dealt as part of the underlying game, then the additional cards may also be compared with the preset criteria again as they are dealt, with the game feature being responsive to the satisfaction of the preset criteria.

Figure 2:
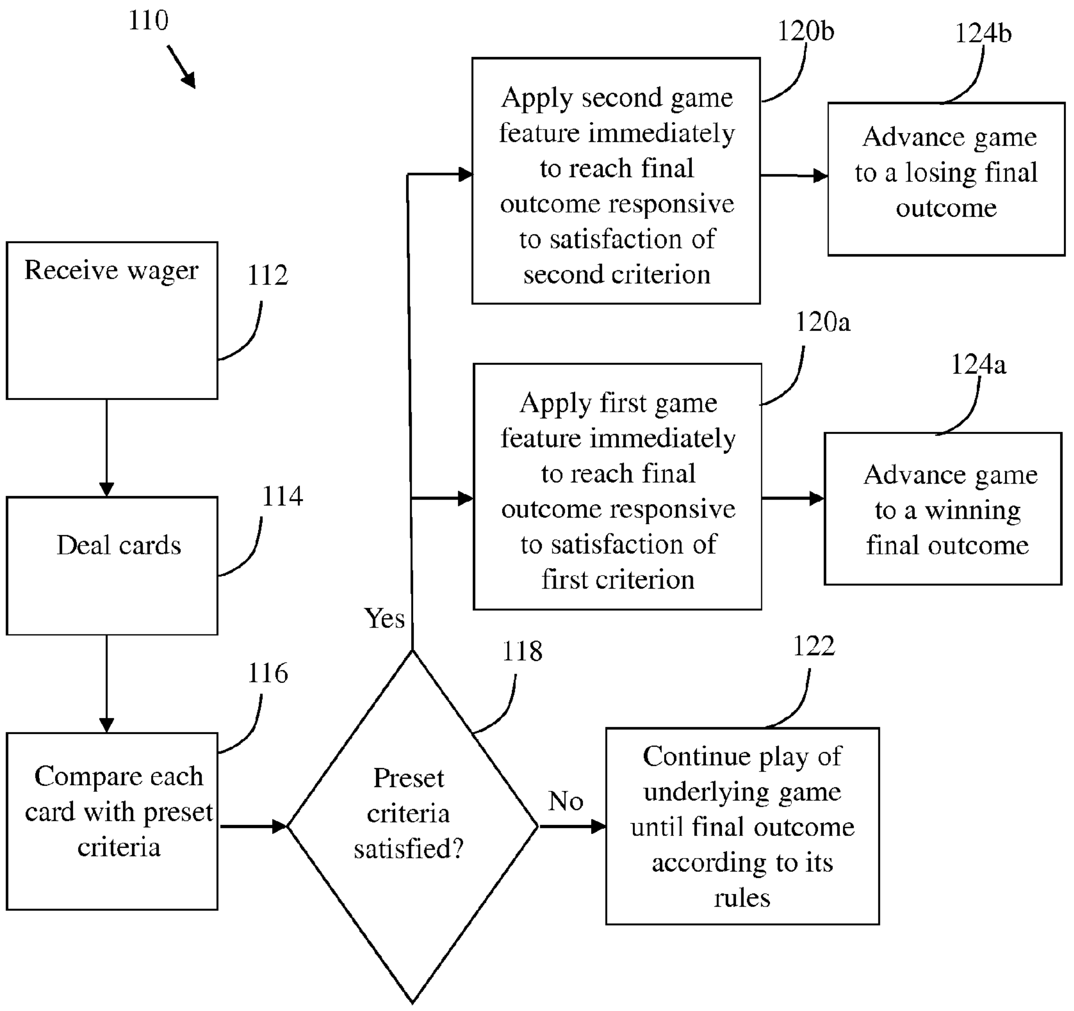
FIG. 2 is a process flow chart depicting another exemplary modified game play method configured and constructed according to some embodiments of the invention.

FIG. 2 illustrates another embodiment of the invention generally referred to by the numeral 110. For purposes of illustration, this embodiment will be discussed as if standard playing cards are the gaming elements.

In this embodiment, comparing each card with the preset criteria in step 116 includes comparing each card with a first criterion and a second criterion. The first and second criterion each relate to identifiable aspects or characteristics of the gaming elements involved in the underlying wagering game and are selected such that there is no gaming element (i.e., playing card, as used for illustrative purposes herein) which would satisfy both the first and second criterion.

For example, the first criterion of identifiable characteristics in this embodiment may be "Five of Clubs," whereas the second criterion of identifiable characteristics may be the "King of Diamonds." Thus, in this example, dealing a Five of Clubs will satisfy the first criterion and dealing a King of Diamonds will satisfy the second criterion in steps 116 and 118.

As shown by steps 118 and 120*a*, if a dealt playing card satisfies the preset criteria for the first criterion, then a first game feature is activated. As shown by steps 118 and 120*b*, if a dealt playing card satisfies the preset criteria for the second criterion, then a second game feature is activated. If the dealt card does not satisfy the preset criteria, then the deal and underlying game continues according to its rules as shown by steps 118 and 122.

In this embodiment, the first game feature involves providing an immediate winning final outcome for the player or dealer dealt the card which satisfied the first criterion as shown by step 124*a*. Thus, the player may be awarded a payout in step 124*a* which may or may not equal their wager, or the wager may be collected if a card dealt to the dealer satisfies the first criterion. The second game feature involves providing an immediate losing final outcome for the player or dealer dealt the card which satisfied the second criterion as shown in step 124*b*. Thus, the player will lose their wager or a portion thereof which may be collected in step 124*b*, or the player or players may win if the dealer is dealt a card that satisfies the second criterion. In either situation, the player is out of the underlying game and will no longer be dealt any further cards as the underlying game continues for the remaining players. It should therefore be noted that a player or dealer is never able to satisfy both the first and second criterion, primarily because an immediate final outcome occurs once either criterion is satisfied.

In some embodiments in which the underlying game involves a dealer hand, the first and second game feature may be applied to the dealer in the same manner as with regard to players, that is, the dealer wins (thus all players lose) or loses (thus all players win) and the game ends responsive to the dealer receiving a card which satisfies either the first or second criterion, respectively. In other embodiments, only a dealer winning outcome may be applied. In yet other embodiments, a dealer loss may entitle the players to a payout equaling a portion of their wager or a preset amount.

Figure 3:
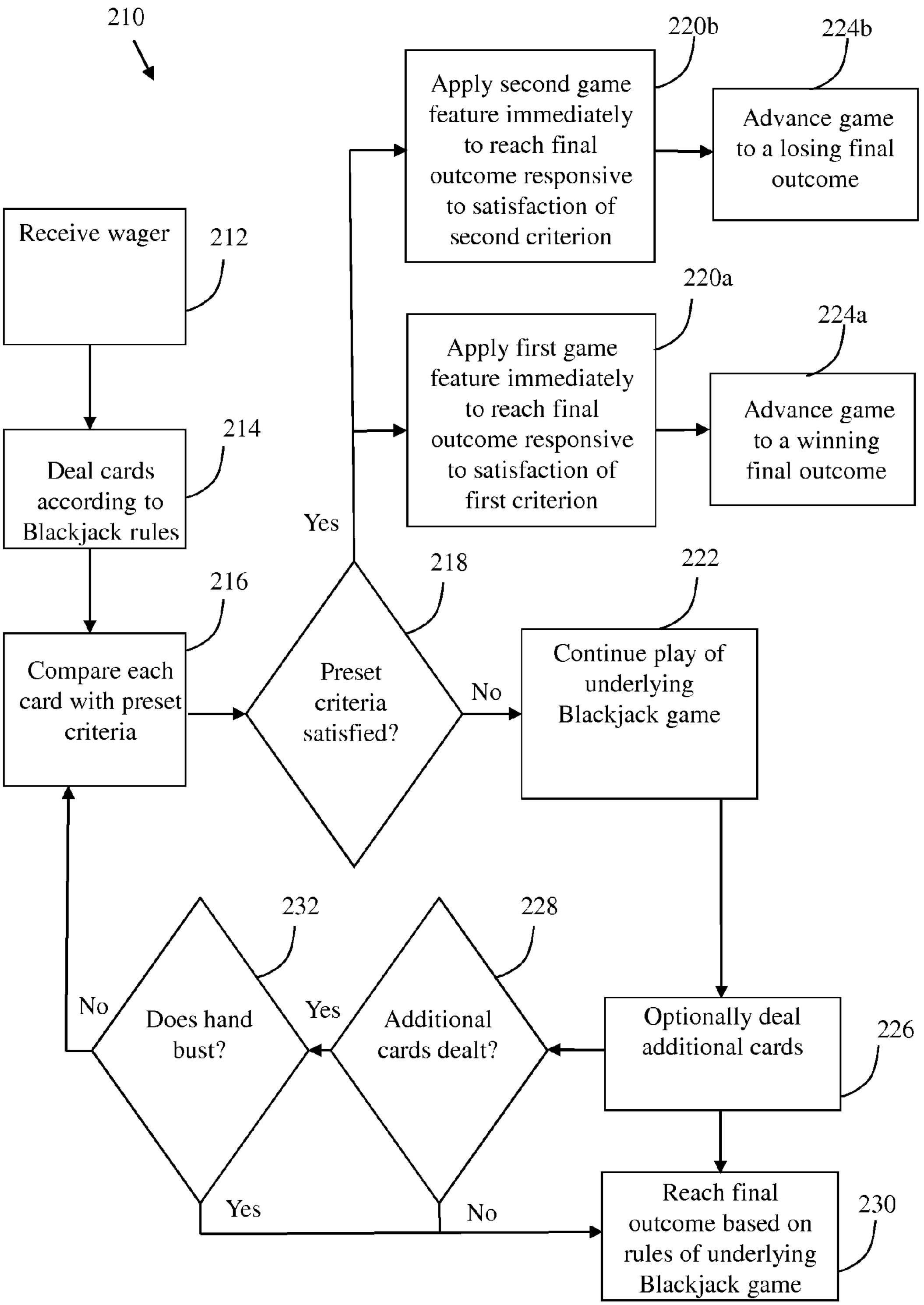
FIG. 3 is a process flow chart depicting another exemplary modified Blackjack game play method configured and constructed according to some embodiments of the invention.

FIG. 3 illustrates another embodiment of the invention generally referred to by the numeral 210. In this embodiment, the underlying game is a Blackjack variant game in which participating players are dealt cards in step 214 after receiving a wager in step 212 to form an initial hand of cards. As each card is dealt, it is compared with the preset criteria in step 216.

As mentioned herein, any value, level or rank of card may be selected as the preset criteria (e.g., all red Fours, Deuces, Queens or Seven of Clubs and the Nine of Diamonds, etc.).

In this embodiment, the preset criteria relates to Jacks, in that the first criterion is a Jack of Clubs or Spades (that is, all "black" Jacks) and the first game play feature responsive thereto is an immediate winning outcome for the player who is dealt either the Jack of Clubs or Jack of Spades to their hand. The second criterion is a Jack of Hearts or Diamonds (all red Jacks), and the second game play feature responsive thereto is an immediate losing outcome for the player who is dealt either the Jack of Hearts or Jack of Diamonds. In this embodiment, the first and second criterion also are applied to the dealer, in that if the dealer receives a Jack of Hearts or Jack of Diamonds the dealer loses and all remaining players win, whereas if the dealer receives a Jack of Clubs or Jack Spades, the dealer wins and all remaining players lose.

In alternative embodiments, the Jack of Clubs is associated with a player/dealer side win in which all players or the dealer wins if one player or the dealer receives the Jack of Clubs, the Jack of Spades is associated with a player/dealer position win only for the player or dealer receiving the Jack of Spades, the Jack of Hearts is a player/dealer side loss if any one player or the dealer receives the Jack of Hearts, and the Jack of Diamonds is a position loss for any player or the dealer that receives the Jack of Diamonds.

As shown by steps 218, 220*a* and 224*a*, if a dealt playing card satisfies the preset criteria for the first criterion, then the hand to which the card was dealt, either player or dealer, immediately wins in the Blackjack game. If a player wins, then no further cards are dealt to the player and the position is considered "paid off and vacant." If the dealer receives the card and wins, then the game ends for all players.

As shown by steps 218, 220*b* and 224*b*, if a dealt playing card satisfies the preset criteria for the second criterion, then the hand to which the card was dealt immediately loses in the Blackjack game. Again, no further cards are dealt and the position is considered to be vacant, or game ends and all participating players automatically receive a winning outcome if the card is dealt to the dealer. In some embodiments, players may receive a portion of their wager, such as half, should a winning outcome for players be caused by the dealer receiving a card which satisfies the second criterion. If the dealt card does not satisfy the preset criteria, then the deal and Blackjack continues to a final resolution of all wagers according to its rules as shown by steps 218 and 222.

In some embodiments, the game play feature is deactivated if the card which satisfies the first and/or second criterion would cause the player to bust in the underlying blackjack game.

It is envisioned that this embodiment may increase the pace of the game and add excitement, while still employing some of the familiar features of blackjack card play. It is envisioned that the use of the preset criteria makes excessive "hand hitting" more interesting, in that depending the embodiment, hitting may be either less useful or viable, more risky or more exciting for the players and dealer.

In some embodiments, the deal follows the conventional Blackjack rules and the dealer's down card is not included for comparative purposes with the preset criteria. In other embodiments, the dealer's hand is dealt only one up-card in the first deal of initial hands or game event of the Blackjack game, and dealt the second card after players have made decisions to hit, stand, split, double down, etc., and the second dealer card is compared with the preset criteria in the same manner as the other cards dealt.

In some embodiments, players may optionally choose to hit and obtain additional cards to improve their hand in step 226. The dealer may also obtain additional cards in step 226 for the dealer hand pursuant to the game rules, which may require the dealer to hit if the dealer hand is 16 or less. If no additional cards are dealt, then as shown by step 228 and 230, a final outcome will be reached according to the rules of the underlying Blackjack game, which may substantially correspond with the conventional rules found in most gaming establishments and online casinos. If additional cards are dealt, then as shown in steps 228 and 232, each of these cards will be compared with the preset criteria in step 216 and 218, unless the player or dealer busts, that is, has a hand equaling more than 21 according to conventional Blackjack rules. If the player or dealer busts, then as shown in steps 232 and 230, the underlying Blackjack game rules are applied and the wager resolved accordingly, even if the card causing the hand to bust is a card satisfying the preset criteria. If no additional cards satisfy the preset criteria, then according to method 210, the Blackjack game will eventually be resolved according to the Blackjack rules in step 232. In some embodiments, players and/or the dealer may be limited to obtaining only a certain amount of additional cards during this sequence, such as one or two additional hit cards only.

In some embodiments, a blackjack hand with a Jack of Spades or Clubs as the "ten-value" card of the blackjack hand will receive a bonus amount.

In some embodiments, if there is one player playing one hand only, the side wager hand may consist of three cards only and only a side wager based on three or less cards, if available, may be placed and received, thus keeping the identity of the second dealer hand card hidden during resolution of the side wager and maintaining the same gameplay in the underlying Blackjack game. It should be readily apparent that one player may also choose to play more than one hand in the game, thus allowing for a side wager hand of four cards in the aforementioned embodiments. In some embodiments, the underlying game may be other than Blackjack but include some cards which are dealt face up while others are dealt face down or otherwise remain initially unexposed as part of the game. It should be readily apparent that in such games, the cards used for the side wager hand may be only the face up cards, thus skipping over the cards dealt face down, regardless of the order in which the face down cards are dealt.

In other embodiments, one or more additional cards may be dealt to form the side wager hand prior to dealing the second card to the dealer hand, thus permitting the side wager hand to consist of four or more cards and allowing a second card to be dealt to the dealer face down after resolution of the side wagers.

Those skilled in the art will readily appreciate that the methods described herein may be incorporated in a system in accordance with the invention using virtual representations of cards and table layouts. The system of the invention may include various computer and network related software and hardware, such as programs, operating systems, memory storage devices, data input/output devices, data processors, servers with links to data communication systems, wireless or otherwise, and data transceiving terminals, and may be a standalone device or incorporated in another platform, such as a mobile device. The system of the invention may be provided on electronic platforms with multiple player positions. In addition, the system of the invention may be provided at least in part on a personal computing device, such as home computer, laptop or mobile computing device through an online communication connection or connection with the Internet. Those skilled in the art will further appreciate that the precise types of software and hardware used are not vital to the full implementation of the methods of the invention so long as players and operators thereof are provided with useful access thereto or the opportunity to play the game as described herein.

Figure 4:
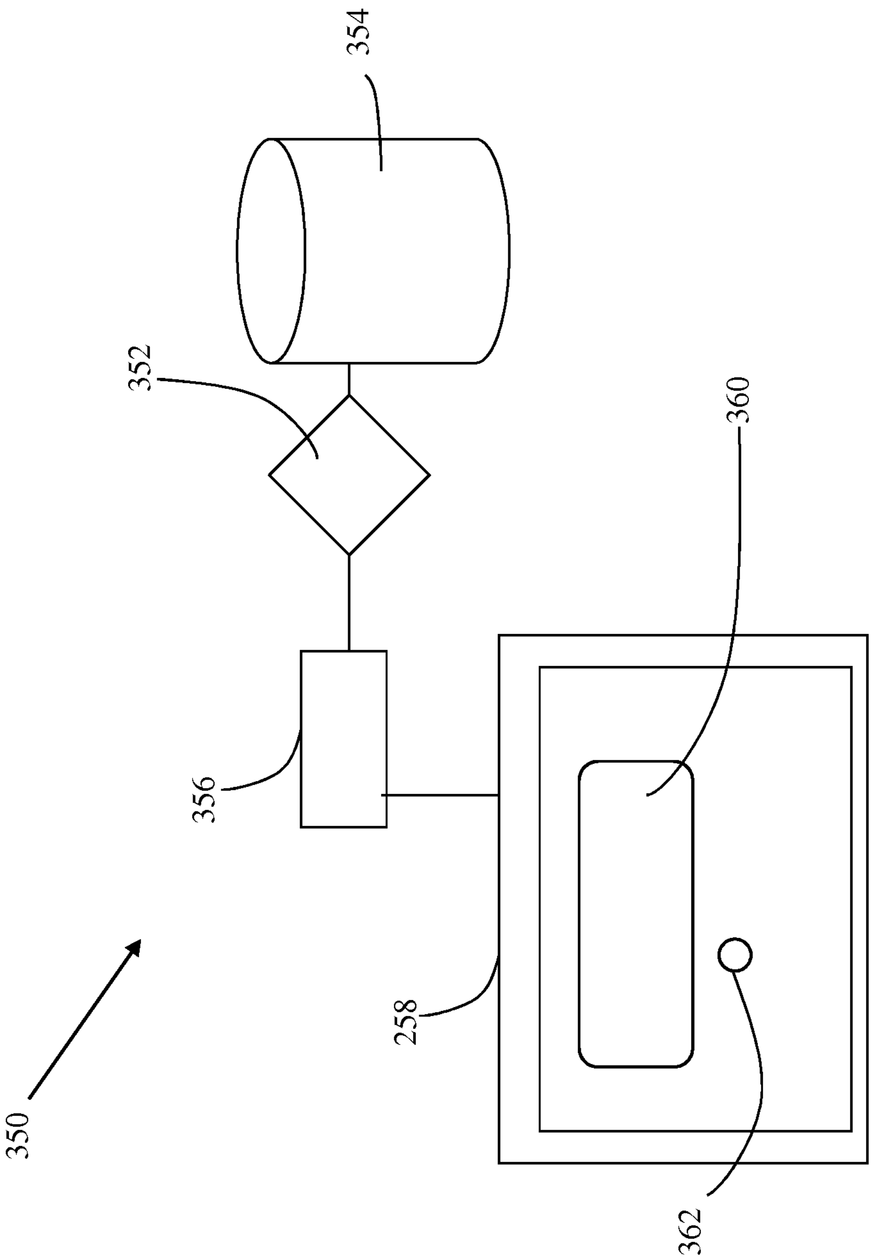
FIG. 4 is a schematic diagram depicting the components of an exemplary system configured and constructed according to some embodiments of the invention.

FIG. 4 illustrates an exemplary system 350 constructed in accordance with some embodiments of the invention. System 350 includes processing device 352 in communication with a database or memory device 354, communication or data input/output device 356 and a display device 358. In some embodiments, display device 358 is a touch-enabled device and includes a data input device component. Memory device 354 may include data relating to the underlying game and embodiments of the invention as described herein, as well as the preset criteria. The player position 360 is displayed on display device 358 along with wagering area 362. Additional wagering areas may be included on display device 358 for side or bonus game wagers. Dealt cards are displayed in player position 360 and processing device 352 compares each card with the preset criteria stored in memory device 354. Other information may be displayed on display 358. Should the preset criteria be satisfied, a final outcome for the game will be determined by processing device 352 in accordance the invention and the same will be indicated on display device 358. If the preset criteria are not satisfied, the wagering game will be played until a final outcome is obtained pursuant to the underlying wagering game rules.

While exemplary systems and methods, and applications of methods of the invention, have been described herein, it should also be understood that the foregoing is only illustrative of a few particular embodiments with exemplary and/or preferred features, as well as principles of the invention, and that various modifications can be made by those skilled in the art without departing from the scope and spirit of the invention. Therefore, the described embodiments should not be considered as limiting of the scope of the invention in any way. Accordingly, the invention embraces alternatives, modifications and variations which fall within the spirit and scope of the invention as set forth in the claims and equivalents thereto.

What is claimed is:

1. A method of providing a modified underlying wagering game involving standard Anglo-American playing cards, comprising the steps of:

a) providing a means for randomly generating standard Anglo-American playing cards;
b) receiving a wager on the final outcome of the underlying game through a communication device;
c) responsive to detecting receipt of the wager through the communication device, displaying randomly generated playing cards according to the rules of the underlying game on a display device;
d) one or more processors facilitating the step of comparing each randomly generated playing card with a preset criteria, wherein the preset criteria includes a first criterion of at least one first identifiable characteristic associated with at least one standard Anglo-American playing card and a second criterion of at least one second identifiable characteristic associated with at least one standard Anglo-American playing card, the first criterion and second criterion not being satisfied by the same standard Anglo-American playing card; and
e) the one or more processors facilitating the step of actuating a game feature responsive to the satisfaction of at least one of the first criterion and second criterion of the preset criteria, wherein the game feature immediately advances the underlying wagering game to a final outcome.

2. A method according to claim 1, wherein the step of providing a means for randomly generating Anglo-American playing cards further comprises the step of dealing one or more playing cards from one or more randomly ordered fifty-two card decks of standard Anglo-American playing cards.

3. A method according to claim 1, wherein the game feature further comprises a first game feature responsive to the satisfaction of the first criterion and a second game feature responsive to the satisfaction of the second criterion, the first game feature being associated with a winning final outcome and the second game feature being associated with a losing final outcome.

4. A method according to claim 3, wherein the winning final outcome comprises a win for a player responsive to the player being dealt a card which satisfies the first criterion.

5. A method according to claim 3, wherein the winning final outcome comprises a win for all players responsive to any one player being dealt a card which satisfies the first criterion.

6. A method according to claim 3, wherein the winning final outcome comprises a win for the dealer responsive to the dealer being dealt a card which satisfies the first criterion.

7. A method according to claim 3, wherein the winning final outcome comprises a payout equal to the wager placed in connection with the hand dealt a card satisfying the first criterion.

8. A method according to claim 3, wherein the winning final outcome comprises a payout unequal to the wager placed in connection with the hand dealt a card satisfying the first criterion.

9. A method according to claim 3, wherein the losing final outcome comprises a loss for the player to which a card is dealt that satisfies the second criterion.

10. A method according to claim 3, wherein the losing final outcome comprises a loss for all players if a card is dealt which satisfies the second criterion to any one player.

11. A method according to claim 3, wherein the losing final outcome comprises a loss for the dealer responsive to the dealer being dealt a card which satisfies the second criterion.

12. A method according to claim 11, further comprising the step of paying a portion of the wager to the player responsive to a losing final outcome for the dealer.

13. A method according to claim 3, wherein the losing final outcome comprises a loss of the wager placed in connection with the hand dealt a card which satisfies the second criterion.

14. A method according to claim 3, wherein the losing final outcome comprises a loss of a portion of the wager placed in connection with the hand dealt a card which satisfies the second criterion.

15. A method according to claim 1, wherein the step of providing a means for randomly generating Anglo-American playing cards further comprises a random number generator facilitating the provision of randomly generated Anglo-American playing cards.

16. A method of providing a modified Blackjack game involving standard Anglo-American playing cards, comprising the steps of:

a) providing a means for randomly generating Anglo-American playing cards;

b) receiving a Blackjack wager from one or more participating players through one or more communication devices;

c) responsive to detecting receipt of the Blackjack wager through the one or more communication devices, displaying randomly generated playing cards to form an initial player hand for each participating player and the dealer according to the conventional rules of Blackjack;

d) one or more processors facilitating the step of comparing each individual randomly generated playing card dealt with a preset criteria, wherein the preset criteria includes a first criterion of at least one first identifiable characteristic associated with at least one standard Anglo-American playing card and a second criterion of at least one second identifiable characteristic associated with at least one standard Anglo-American playing card, the first criterion and second criterion not being satisfied by the same standard Anglo-American playing card; and e) the one or more processors facilitating the step of actuating a game feature responsive to the satisfaction of at least one of the first criterion and second criterion of the preset criteria, wherein the game feature immediately advances the Blackjack game to a final outcome for one or more Blackjack wagers.

17. A method according to claim 16, wherein the step of providing a means for randomly generating Anglo-American playing cards further comprises at least one of the following two steps: the step of dealing one or more playing cards from one or more randomly ordered fifty-two card decks of standard Anglo-American playing cards; and the step of a random number generator facilitating the provision of randomly generated Anglo-American playing cards.

18. A method according to claim 17, wherein the first criterion is a Jack of Clubs or Jack of Spades.

19. A method according to claim 17, wherein the second criterion is a Jack of Hearts or Jack of Diamonds.

20. A method according to claim 16, wherein the game feature further comprises a first game feature responsive to the satisfaction of the first criterion and a second game feature responsive to the satisfaction of the second criterion, the first game feature being associated with a winning final outcome and the second game feature being associated with a losing final outcome.

21. A method according to claim 20, wherein the winning final outcome comprises a win for a player responsive to the player being dealt a card which satisfies the first criterion.

22. A method according to claim 20, wherein the winning final outcome comprises a loss for a player responsive to the player being dealt a card which satisfies the second criterion.

23. A method according to claim 20, wherein the winning final outcome comprises a win for the dealer responsive to the dealer being dealt a card which satisfies the first criterion.

24. A method according to claim 20, wherein the losing final outcome comprises a loss for the dealer responsive to the dealer being dealt a card which satisfies the second criterion.

25. A method according to claim 20, wherein the winning final outcome comprises a payout equal to the wager placed in connection with the hand dealt a card satisfying the first criterion.

26. A method according to claim 20, wherein the winning final outcome comprises a payout unequal to the wager placed in connection with the hand dealt a card satisfying the first criterion.

27. A method according to claim 20, wherein the losing final outcome comprises losing a portion of the wager placed in connection with the hand dealt a card satisfying the second criterion.

28. A method according to claim 16, further comprising the steps of:

a) randomly generating one or more additional playing cards to be added to the initial player hand to form a final player hand for any participating players remaining in the game;

b) the one or more processors facilitating the step of comparing each of the one or more dealt additional playing cards with the preset criteria; and c) the one or more processors facilitating the step of actuating the game feature responsive to the satisfaction of the preset criteria by an additional playing card, wherein the game feature immediately advances the Blackjack game to a final outcome if the final player hand to which the additional card is added does not result in a bust condition according to the conventional rules of Blackjack.

29. A system for providing a modified Blackjack game, comprising:

a) a communication device configured for receiving a Blackjack wager from a participating player and administering an award payout for a winning outcome to the player;

b) a processor configured for:

i) providing representations of Anglo-American playing cards to form an initial player hand;

ii) comparing each playing card dealt with a preset criteria, wherein the preset criteria includes a first criterion of at least one first identifiable characteristic associated with at least one standard Anglo-American playing card and a second criterion of at least one second identifiable characteristic associated with at least one standard Anglo-American playing card, the first criterion and second criterion not being satisfied by the same standard Anglo-American playing card;

iii) applying a game feature responsive to the satisfaction of at least one of the first criterion and second criterion of the preset criteria, wherein the game feature immediately advances the Blackjack game to a final outcome for the Blackjack wager, the final outcome being a winning outcome or a losing outcome; and c) a display device configured for displaying the playing cards to the participating player.

30. A system according to claim 29, wherein the communication device, processor and display device are mounted within a unitary housing.

31. A system according to claim 29, wherein the processor is remotely located from the display device and communication device.

* * * * *